T. F. RATAICZAK.
MEAT CHOPPER.
APPLICATION FILED JAN. 14, 1916.

1,219,586.

Patented Mar. 20, 1917.

Inventor
Thomas F. Rataiczak
by Allen & Allen
Attorneys

UNITED STATES PATENT OFFICE.

THOMAS F. RATAICZAK, OF TROY, OHIO, ASSIGNOR TO THE HOBART MANUFACTURING COMPANY, OF TROY, OHIO, A CORPORATION OF OHIO.

MEAT-CHOPPER.

1,219,586.   Specification of Letters Patent.   Patented Mar. 20, 1917.

Application filed January 14, 1916. Serial No. 72,031.

*To all whom it may concern:*

Be it known that I, THOMAS F. RATAICZAK, a citizen of the United States, and a resident of the city of Troy, in the county of Miami and State of Ohio, have invented certain new and useful Improvements in Meat-Choppers, of which the following is a full, clear, and exact description, reference being had to the accompanying drawing, forming part of this specification.

My invention relates to meat choppers and the like, wherein the meats to be chopped are fed by means of a worm revolving in a casing to a cutter which chops up the meats that are then forced through a foraminated plate. This is the ordinary type of chopper of familiar type.

In the use of such choppers, an operator is likely to get a finger caught in the worm if he carelessly presses down the meats in the feed hopper or bowl, and when so caught unless he is very quick, the finger will be drawn into the casing of the machine and mangled or cut off by the worm.

It is the object of this invention to provide a safety device whereby the operator, even after his finger is caught, may withdraw it before it is fed into the machine.

I accomplish this object by that certain construction and arrangement of parts to be hereinafter more specifically pointed out and claimed, wherein a portion is removed from the worm, which will give a clearance space at the outer end of the worm such that a gap will be left between the worm and the casing at the point where the finger would otherwise be drawn into the casing of the chopper.

Figure 1:
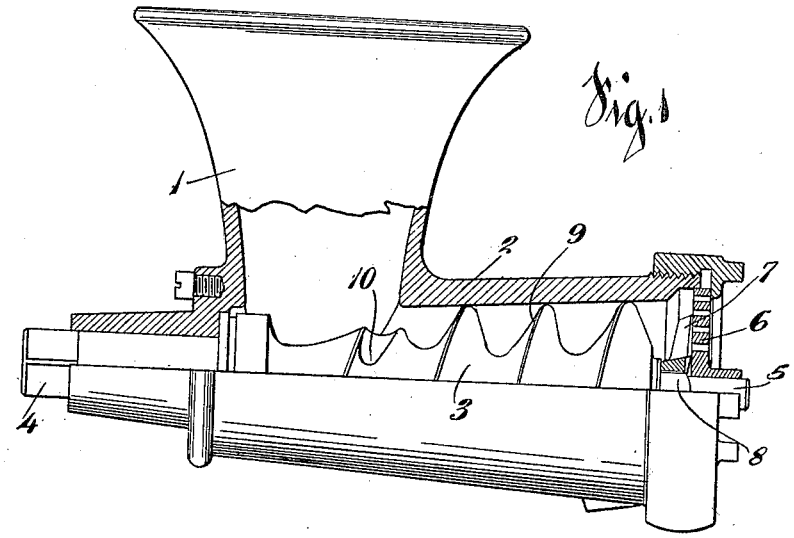
Figure 1 is a side elevation of the machine with the casing partly broken away to show the new form of worm.

1 is the bowl of the chopper, and 2 is the cylindrical casing or chopper cylinder. The worm 3 is journaled in the casing, having a shaft 4 at one end and a smaller shaft 5 at the other. The delivery end of the chopper cylinder is closed by a foraminated plate 6, suitably clamped in place and the worm shaft member 5 is journaled in the center of this plate. The shaft member or stud 5 carries the knife 7 on a suitable squared portion 8, so that the knife revolves adjacent to the foraminated plate and chops up the meats delivered to it by the worm.

The worm has the ordinary convolutions 9 gradually increasing in size toward the delivery or chopping end of the machine and the safety device consists in cutting away a portion of the worm convolution which would be the one that would force a finger into the chopper cylinder, or in other words, the portion of a convolution which when the worm revolves would come nearest to the upper edge of the mouth of the chopper cylinder.

Figure 3:
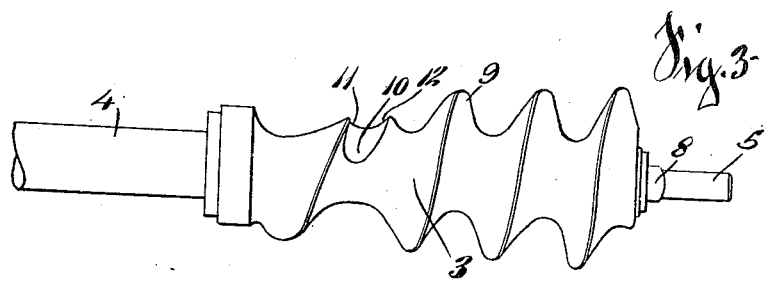
Figure 4:
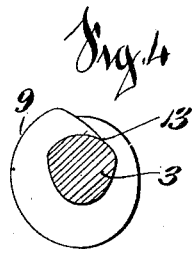
Fig. 4 is a vertical section, taken on the line 4, 4, of Fig. 2.

In Figs. 1 and 3, the cut 10 is made. This cut is made in the worm convolutions so as to remove the inclined worm face which would exert pressure to force an object into the cylinder. The cut is made so as to form a proper concavity with sloping edges 11 and 12 which will still feed the meats, but will leave a gap between the worm and the edge of the chopper cylinder. It is as if that cut away portion were a smaller worm cut on the face of the large worm, said large worm as is customary being made of the size to fill the chopper cylinder.

With the object in view of so mutilating the worm that the required clearance at the point now indicated shall be provided without at the same time destroying the feed in the chopper, there are of course various modifications which might be adopted over the structure now described.

Figure 2:
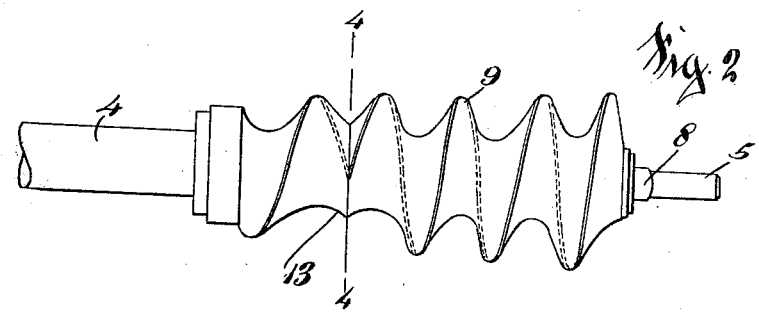
Fig. 2 is a side elevation of one type, and Fig. 3 a like view of another type of worm exemplifying my invention.

The modification in Fig. 2 is formed by making a cut 13 partly in one convolution and partly in another. The operation results in the same shape of worm as if a cut were made through an unmutilated worm and one part turned co-axially with the other for one hundred and eighty degrees, thereby leaving a worm of mutilated appearance with the necessary clearance.

Various other forms could be designed to accomplish the object stated, the necessary feature for the cuts being that they do not entirely cut off the feed of the worm. Of course as soon as the meats get into the chopper cylinder they are fed as in the usual form of machine.

Having thus described my invention, what I claim as new and desire to secure by Letters Patent, is:—

1. In a meat chopper or the like, a hopper, a chopper cylinder, a revoluble worm in the cylinder and extending across the base of the hopper, and said worm being cut to leave a clearance space between it and the upper end of the mouth of the chopper cylinder and form a discontinuance of the feed.

2. In a meat chopper or the like, a chopper cylinder, a hopper, a revoluble worm in the cylinder and extending across the base of the hopper, and having that portion of the worm which extends across the base of the hopper displaced angularly but coaxially with respect to that part of the worm which lies purely within the chopper cylinder so as to give a discontinuity of feeding between such two portions of the worm.

3. In a meat chopper or the like, a chopper cylinder, a hopper, a revoluble worm in the cylinder and extending across the base of the hopper, means for intermittently discontinuing the feeding of that portion of the worm lying across the base of the hopper with respect to that part which lies purely within the cylinder without distorting the cylinder.

THOMAS F. RATAICZAK.

Witnesses:
CHARLES C. WILLARD,
H. L. JOHNSTON.

Copies of this patent may be obtained for five cents each, by addressing the "Commissioner of Patents, Washington, D. C."